CONTAINER CLOSING MACHINERY

Original Filed March 24, 1960 3 Sheets-Sheet 1

INVENTOR.
JACK M. WHEATON
BY J. RALPH HOGE and
W. A. SCHAICH
ATTORNEYS

CONTAINER CLOSING MACHINERY

Original Filed March 24, 1960 3 Sheets-Sheet 2

INVENTOR.
JACK M. WHEATON

BY J. RALPH HOGE and
W. A. SCHAICH
ATTORNEYS

CONTAINER CLOSING MACHINERY

Original Filed March 24, 1960 3 Sheets-Sheet 3

INVENTOR.
JACK M. WHEATON
BY
J. RALPH HOGE and
W. A. SCHAICH
ATTORNEYS

United States Patent Office

Re. 25,962
Reissued Feb. 22, 1966

25,962
CONTAINER CLOSING MACHINERY

Jack M. Wheaton, Toledo, Ohio, assignor to Owens-Illinois Glass Company, a corporation of Ohio Original No. 3,040,493, dated June 26, 1962, Ser. No. 17,322, Mar. 24, 1960. Application for reissue June 25, 1964, Ser. No. 390,253
6 Claims. (Cl. 53—167)

Matter enclosed in heavy brackets [ ] appears in the original patent but forms no part of this reissue specification; matter printed in italics indicates the additions made by reissue.

The present invention relates to improvements in container closing machinery and more particularly to apparatus for washing the exterior neck surfaces of filled containers prior to sealing with closure caps.

In the packaging of various products in small containers, glass jars for example, it often happens that product overflows or is spilled or incident to handling is splashed onto the exterior surface of the neck portion of the container. To leave the spilled product on this surface would result in product being trapped under the closure cap and result in rusting of the cap, contamination of the product, and the creation of a most unsightly appearance.

In certain types of closing machines, an example of which is disclosed in U.S. Patent No. 2,659,522, it is necessary to move the filled container in an arcuate path to the sealing machine. This latter described movement has been a limiting factor, which determined the speed at which the sealing machine could be operated. This is because as the filled containers move in an arcuate path, the resulting centrifugal force tends to throw some of the product out of the container, thereby causing spillage of the product and accumulation on the exterior surfaces of the neck.

Accordingly, it is an object of this invention to provide an apparatus for cleaning the neck portion of filled containers.

Another object of my invention is to provide an apparatus for preventing spillage of product from filled containers as the latter are transferred from a main conveyor line to an adjacent closing machine.

The specific nature of this invention, as well as other objects and advantages thereof, will become apparent to those skilled in the art from the following detailed description taken in conjunction with the annexed sheets of drawings, on which, by way of example only, the preferred embodiment of this invention is illustrated.

Basically my invention comprises an apparatus for automatically temporarily closing the mouths of containers with discs as they move in an arcuate or other path to a capping or sealing machine 15 and then cleaning the neck portion of the containers while their mouths are thus covered. These discs serve the dual purpose of preventing the cleaning agent from entering the containers and the product from spilling out of the containers as they move in an arcuate path. In addition, my invention also includes means for cleaning the discs when they are not covering the mouth of a container.

Figure 1:
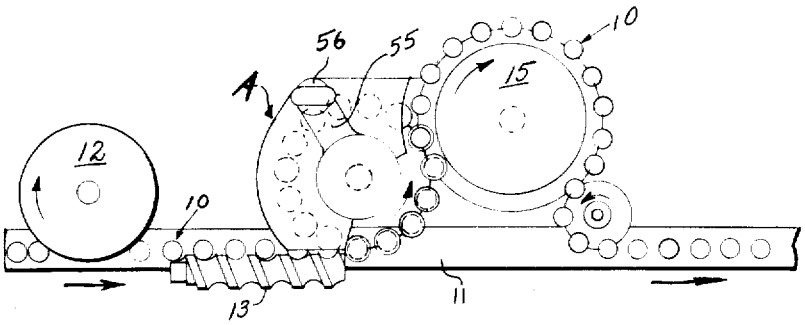
FIG. 1 is a schematic plan view of a container filling and closing line showing the position occupied by the neck cleaning apparatus.

Referring to FIG. 1, containers 10, glass jars for example, are carried on a horizontal line conveyor 11 to a conventional filling machine 12. After being filled, the containers 10 are again deposited on the conveyor 11. Moving along the conveyor 11, the containers 10 come into contact with a spacing and timing screw 13, which provides for the proper delivery of the containers 10 to the neck cleaning apparatus A. From this neck cleaning apparatus A, the containers 10 move to a conventional vapor sealing or capping unit 15, from which they are removed and transfered back to the conveyor 11, the latter carrying the sealed containers to a packing station (not shown).

Figure 3:
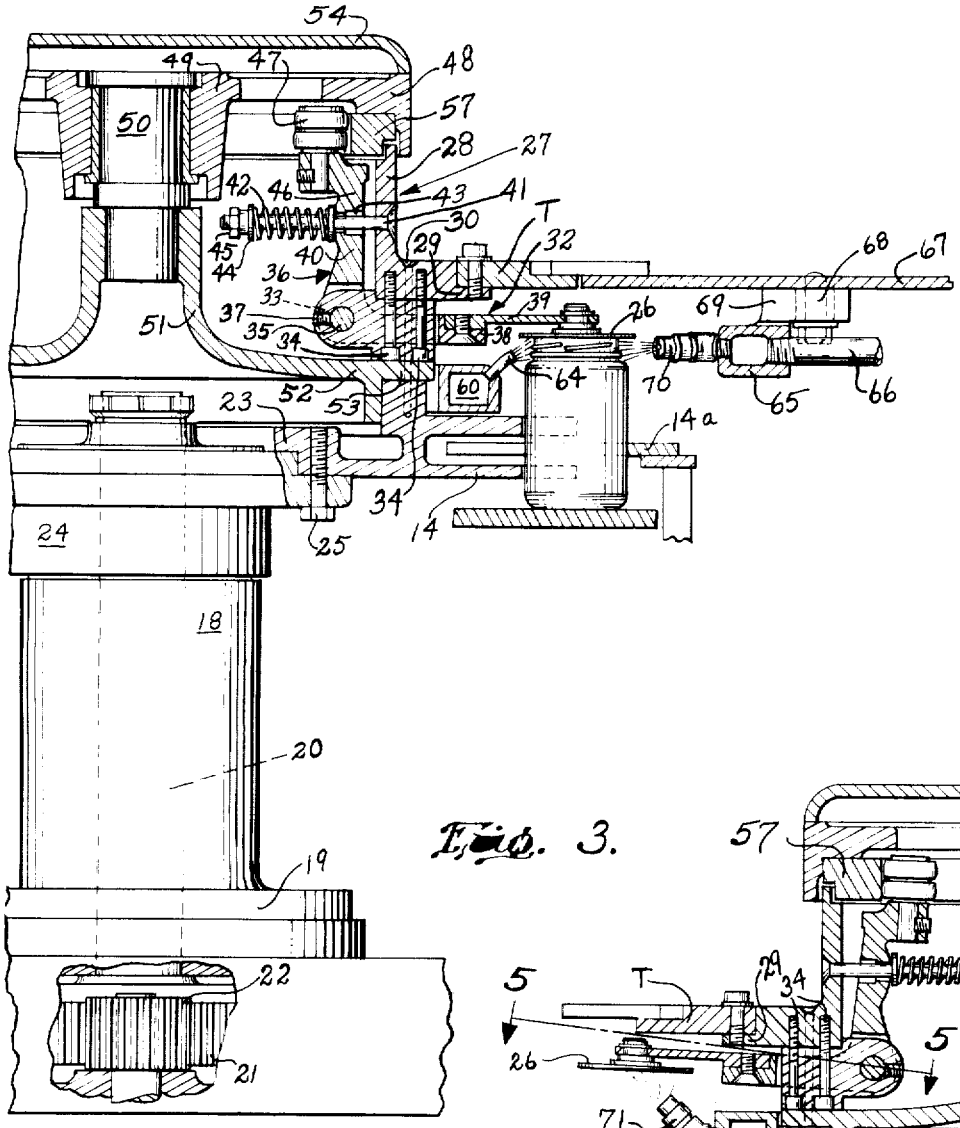
FIG. 3 is a vertical sectional elevational view of the neck cleaning apparatus taken substantially along the line 3—3 of FIG. 2.

The aforementioned conveyor 11 (FIG. 6), in proximity to the neck cleaning apparatus A, rides upon guide rails 16 which are supported upon a bracket 17, the latter extending horizontally from a pedestal 18. Referring to FIG. 3, this pedestal 18 rises from a base 19 and houses a vertical shaft 20, the lower end of which carries a ring gear 21, running in mesh with a driving pinion 22. A conventional star wheel 14 is connected to the upper end of the shaft by means of a web 23 and flanged hub 24, said web and hub being secured together by screws 25, or bolts. This star wheel is of conventional form and together with an arcuate guide rail 14a accurately positions the filled jars beneath and in proper register with the mouth covers 26. These mouth covers 26 are arranged in an annular series and are mounted upon a rotary carriage 27.

Figure 5:
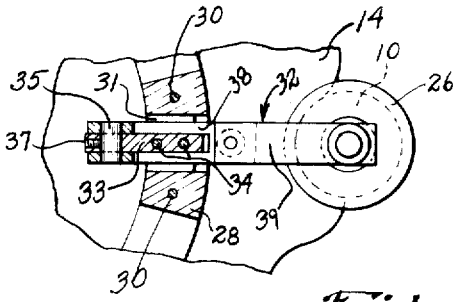
FIG. 5 is a horizontal sectional view taken along the line 5—5 of FIG. 4.

This rotary carriage 27 moves as a unit with the star wheel 14 to which it is separably and rigidly connected and includes a cylindrical vertical wall 28 having a radial attaching flange 29. The flange carries a rotatable closure supporting table T and in turn rests upon the star wheel to which it is secured by screws 30. The pupose of this closure supporting table is disclosed in U.S. Patent No. 2,659,522. Below this flange 29 the vertical wall 28 is of greater thickness than above said flange and in this area is provided with an annular series of radial openings 31 (FIG. 5) corresponding in number to that of the mouth covers 26. In each of these openings a mouth cover carrier 32 is mounted.

Each mouth cover carrier unit comprises a bearing block 33 (FIGS. 3 and 5) which is secured by screws 34 to the upper wall of the opening 31 and extends radially inwardly beyond said opening. A hinge pin 35 is mounted in the inner end of said bearing block and has its ends extended a short distance beyond each side of the latter to support a bell-crank lever 36. A screw 37 secures the hinge pin in place. This bell-crank lever includes an arm 38 which extends radially outward through said opening 31 and is slotted to straddle the bearing block. The inner end of this arm is rockably mounted upon the hinge pin 35. The outer end of this arm 38 is separably connected to a finger 39 to which the mouth cover 26 is secured. Such separable connecting facilitates interchanging the mouth covers as operating conditions and the size of the containers may require. The mouth covers are thin discs of a sterilizable material, such as stainless steel; and they are made sufficiently thin so that they can flex to take up slight variations in the top surface of the container. The other arm 40 of the bell-crank lever extends upwardly in proximity to the inner side of the cylindrical wall 28. Spring means consisting of a guide pin 41 is anchored in the vertical wall 28 and extends radially inwardly through an opening 43 in said arm 40 and at its inner end carries a washer 44 and nut 45, the latter element being adjustable to regulate the tension of the coil spring 42. The upper end 46 of the arm 40 of this bell-crank lever is offset and carries a pair of superposed cam rollers 47 which run upon cams 57 and 58 shaped to move the bell-crank lever as required.

These cams 57 and 58 are stationary and supported by a carrier 48 or spider, which includes a vertical center bearing 49 for a stub shaft 50, the latter carried by a support 51. This support 51 includes a peripheral flange 52 which is provided with an annular series of radial fingers 53 extending into openings 31 of said vertical wall 28. The spider and a cover 54, therefore, are connected by means of a horizontal arm 55 (FIGS. 1 and 2) to a post 56 and thereby further supported and held against undesired movement.

One cam 57 (FIGS. 2 and 3) is continuous and throughout a major part of its length is shaped to hold the bell-crank levers so that the mouth covers occupy their elevated positions. That portion of its length which is adjacent the spray nozzles 64 is shaped to allow the mouth covers to rest on the containers. This cam engages the lower cam rollers. An adjustable cam 58 is mounted in a cut-out portion of the first named cam 57 and is pivoted at one end to the latter. One end of the pivoted cam is engaged by an adjusting screw 59 which is mounted in the spider. By manipulation of this screw the pivoted, or adjustable cam may be located to permit any desired degree of elevation of the mouth covers. This varies in accordance with the point at which the containers are removed from the neck cleaning apparatus.

Figure 2:
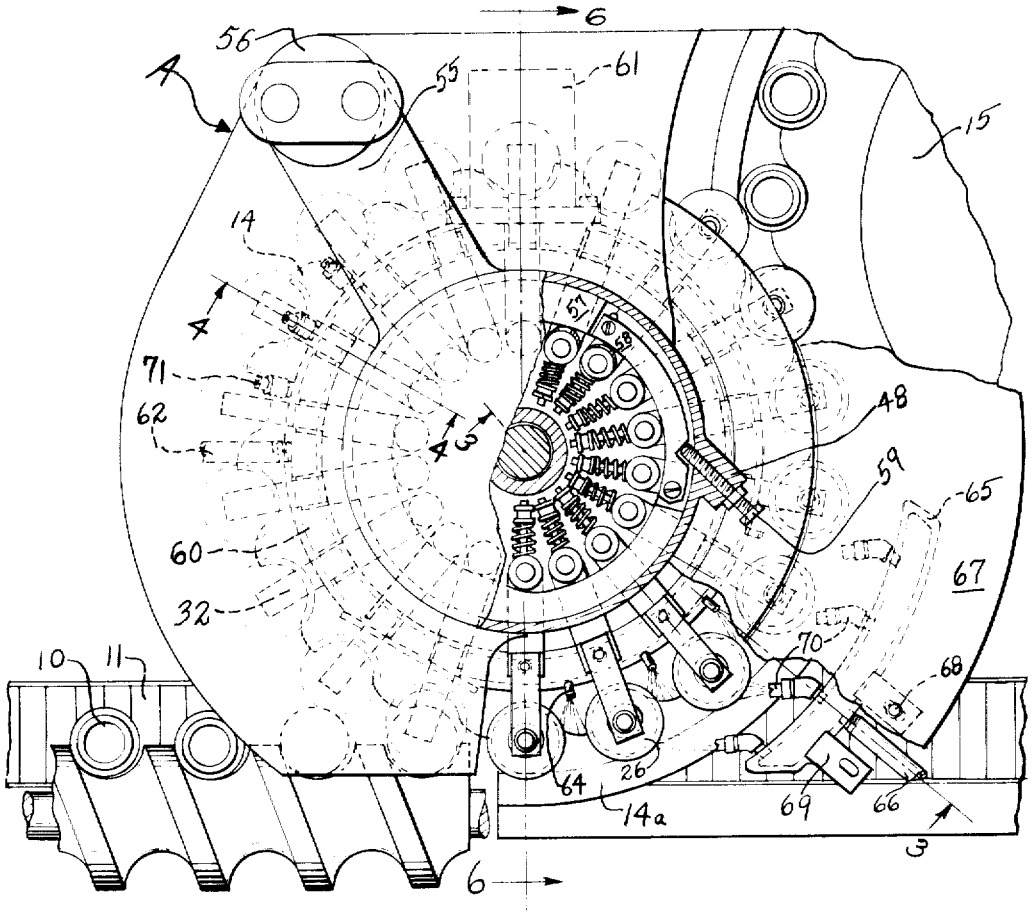
FIG. 2 is a top plan view, partly in section, of the neck cleaning apparatus.
Figure 6:
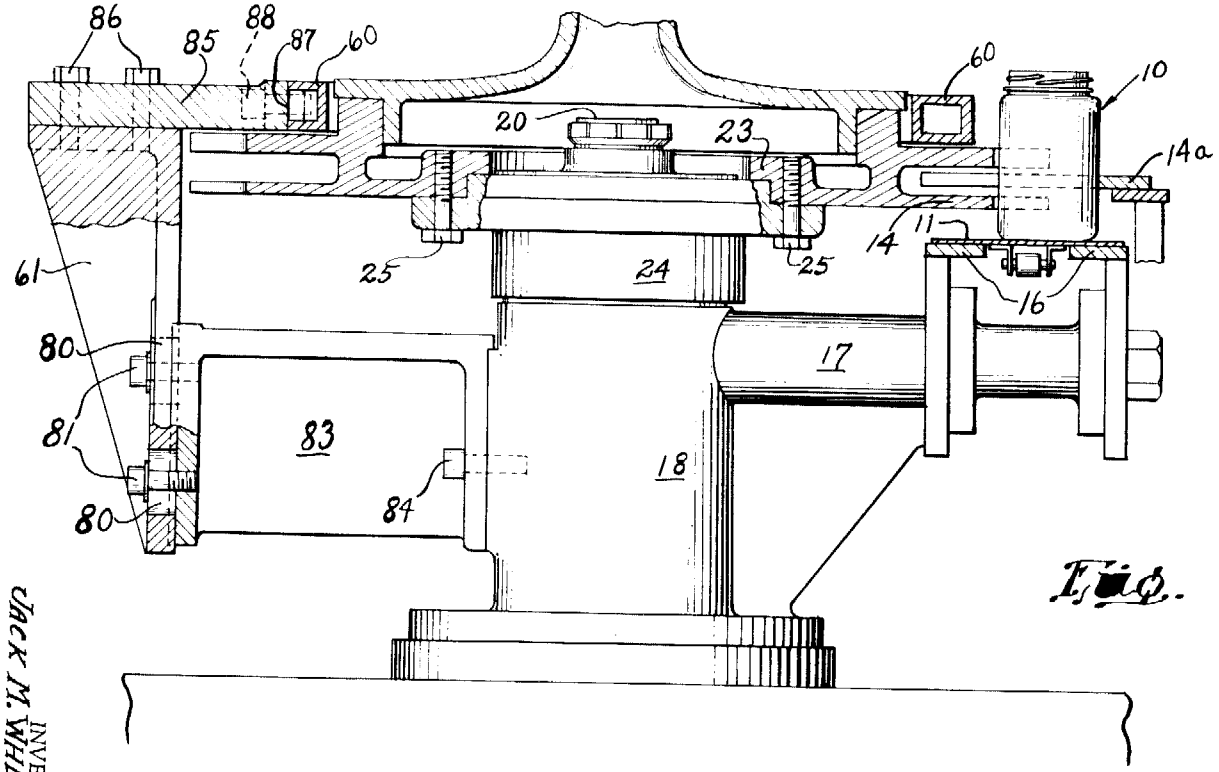
FIG. 6 is a fragmentary vertical sectional view taken substantially along the line 6—6 of FIG. 2.

Encircling the upper portion of the star wheel 14 is a circular hollow chamber 60 which is supported and held stationary by a vertically adjustable bracket 61 (FIGS. 2 and 6). The bracket 61 has at its lower end vertically elongated slots 80, through which extend bolts 81, securing the bracket to a flanged support 83. This support 83 is in turn bolted to the pedestal 18 by means of bolts 84. The vertically elongated slots 80 permit vertical adjustment of the bracket 61. The upper end of the bracket 61 is secured to a plate 85 by means of bolts 86, the plate in turn is bolted to a flattened portion 87 on the chamber 60 by means of bolts 88; thereby forming a rigid connection between the bracket and the chamber. This chamber 60 is connected to a cleaning fluid source (not shown) by a supply tube 62. Chamber 60 also carries a series of circumferentially spaced radially outwardly directed spray nozzles 64 through which cleaning fluid, such as heated water or steam, is sprayed onto neck portions of the containers (FIG. 3). These spray nozzles 64 are adjusted so that the cleaning fluid will strike only those containers which have their mouths closed by the mouth covers 26.

Spaced radially outward from the first-mentioned chamber 60 at the inlet to the cleaning apparatus A is a second hollow chamber 65, which is connected to a supply of cleaning fluid by a supply tube 66. This second chamber 65 is rigidly supported by a stationary plate 67 and connected to this plate by means of a spacer 69 and a nut and bolt 68. The second chamber 65 carries a series of radially inwardly directed spray nozzles 70 which also spray cleaning fluid onto the neck portions of the containers. These spray nozzles 70 are adjusted so that they spray only closed containers.

Figure 4:
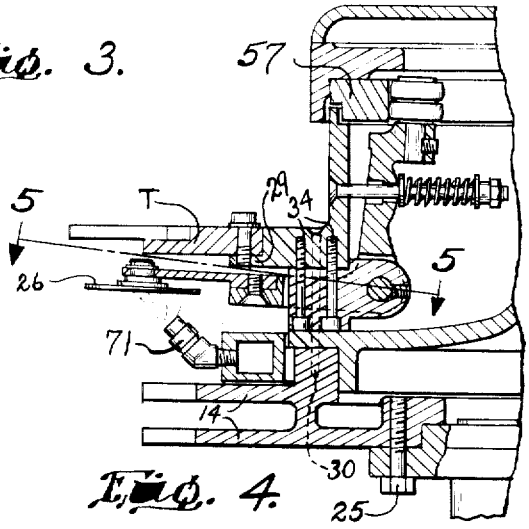
FIG. 4 is a fragmentary vertical sectional view taken substantially along the line 4—4 of FIG. 2.

On the opposide side of the circular chamber 60 from the first-mentioned spray nozzles 64 is another series of circumferentially spaced spray nozzles 71. These nozzles 71 are adjusted so that they spray and cleanse the undersides of the mouth covers 26 (FIG. 4). These latter-mentioned nozzles 71 clean the undersides of the mouth covers, thereby preventing any build-up of material which might, if not cleaned off, be deposited in succeeding jars and cause contamination.

Briefly, the operation involves feeding filled containers in succession to the neck cleaning apparatus A, lowering the mouth covers onto the mouths of the containers to temporarily seal the same and to prevent spillage of product, moving the containers while thus covered in an arcuate or other defined path and spraying their neck portions with a cleaning fluid to remove any product spilled during filling, elevating the mouth covers, and then passing the containers through the vapor or capping sealing unit 15; and simultaneously with the above operations, elevating the mouth covers and spraying their under surfaces with a cleaning fluid to remove any product remaining thereon at a point where their path of travel does not overlie the path of travel of the containers.

It will, of course, be understood that the various details of construction may be modified through a wide range without departing from the principles of this invention, and it is not, therefore, the purpose to limit the patent granted hereon otherwise than necessitated by the scope of the appended claims. As an example, the mouth covers 26, although stated to be thin discs of stainless steel, may in practice be formed of a plastic or some rubber or rubber-like material.

I claim:

1. In combination, means for moving upright open-mouthed, filled containers is succession along a horizontal path including an arcuate section, means for effecting uniform spacing of the containers along said path, a series of vertical movable container mouth covers movable along a closed horizontal, arcuate path at least in part overlying the path of said containers, means for moving the covers along said last-named path, means for lowering said mouth covers onto the mouths of said containers in one section of their path of travel, means for elevating the mouth covers and holding them elevated in another section of their path of travel, and cleaning means for directing a cleaning medium against the exterior surfaces of the mouth ends of said containers when their mouths are closed by said covers, said cleaning means comprising a non-rotatable circular hollow chamber adjacent and spaced radially inwardly from and concentric with the path of travel of said mouth covers, said chamber having an annular series of spray nozzles to direct cleaning fluid radially outwardly and means for supplying cleaning fluid under pressure to said chamber.

2. Apparatus as defined in claim 1, and a stationary second chamber adjacent and spaced radially outwardly from the path of said mouth covers, said second chamber having a series of spray nozzles to direct a cleaning fluid against the exterior surfaces of the neck portions of said containers when their mouths are closed, and means for supplying cleaning fluid under pressure to said second chamber.

3. In combination, means for moving upright open-mouth, filled containers in succession along a horizontal path, bell-crank levers individual to and directly suptainers along said path, a series of vertically movable container mouth covers movable also along a horizontal path at least in part overlying the path of said containers, means for moving the covers along said last-named path, bell-crank levers individual to and directly supporting said mouth covers, spring means for moving said levers to thereby lower the mouth covers onto said containers and an adjustable cam for moving the levers in opposition to the spring means to thereby elevate said mouth covers and regulably predetermine the lowermost position of the mouth covers, means for directing a cleaning medium against the exterior surface of the mouth end of said containers when their mouths are closed by said covers, and means for cleaning the undersides of the elevated mouth covers.

4. In combination, means for moving open-mouth filled containers along a horizontal path comprising a star wheel mounted for rotation about a vertical axis, said star wheel having an annular series of container spacing devices at its periphery, mouth covering means comprisnig an annular series of vertically movable discs arranged above said star wheel for movement with the latter about said axis, said discs being adapted to provide a liquid-tight seal with the mouths of said containers, means for lowering said mouth covers onto and elevating them relative to the containers whereby said containers are sequentially provided with a liquid-tight seal and opened, first cleaning means for directing a cleaning medium against the exterior surface of the mouth end of the containers when their mouths are sealed by said covers, and second cleaning means for cleaning the undersides of said mouth covers, said second cleaning means being located in a position remote from said first cleaning means.

5. The combination defined in claim 4, wherein said first and second cleaning means are stationary and include a series of spray nozzles.

*6. A washer for unsealed containers comprising the combination of means to move a plurality of containers in an arcuate path, a container sealer rotatably mounted above said container moving means including a plurality of said sealer into sealing contact with each of the*

*that a portion of the rotational path of said sealer is above the arcuate path of the containers on said container moving means, means to move a sealing member of said sealer into sealing contact with each of the mouths of containers on said container moving means, container washing means positioned to clean said container washing means positioned to clean said containers while sealed by said container sealer, and sealer washing means positioned to clean each of said sealing members when it is remotely positioned from said arcuate path.*

References Cited by the Examiner

The following references, cited by the Examiner, are of record in the patented file of this patent or the original patent.

UNITED STATES PATENTS

| | | |
|---|---|---|
| 1,714,075 | 5/1929 | Carvalho. |
| 1,833,614 | 9/1931 | Darling. |
| 2,529,199 | 11/1950 | Stover. |
| 2,884,751 | 5/1959 | Bjering. |

CHARLES A. WILMUTH, *Primary Examiner.*